(No Model.) 2 Sheets—Sheet 1.

R. L. WOODLING.
CHECK ROW CORN PLANTER.

No. 433,757. Patented Aug. 5, 1890.

Witnesses:
E. P. Ellis,
B. Brockett,

Inventor:
R. L. Woodling,
per Lehmann & Pattison,
attys (No Model.) 2 Sheets—Sheet 2.
R. L. WOODLING.
CHECK ROW CORN PLANTER.

No. 433,757. Patented Aug. 5, 1890.

Witnesses:
E. P. Ellis,
B. Brockett,

Inventor:
R. L. Woodling,
per Lehmann & Pattison, attys

UNITED STATES PATENT OFFICE.

REASON L. WOODLING, OF LOGANSPORT, INDIANA.

CHECK-ROW CORN-PLANTER.

SPECIFICATION forming part of Letters Patent No. 433,757, dated August 5, 1890.

Application filed May 12, 1890. Serial No. 351,458. (No model.)

*To all whom it may concern:*

Be it known that I, REASON L. WOODLING, of Logansport, in the county of Cass and State of Indiana, have invented certain new and useful Improvements in Check-Row Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in check-row corn-planters; and it consists in, first, the shoes on the ends of the arms, and which consist of metallic plates or projections which have their outer ends bent at any suitable angle, and plates applied to opposite sides of the ends of the arms and having their outer ends turned outward at an angle; second, the combination of the arms, the braces which connect the arms, and the trip-blocks which are adjustably secured to the braces; and, third, in the arrangement and combination of parts, which will be more fully described hereinafter.

The object of my invention is to provide a check-row corn-planter which will mark the ground at each point where the grain has been dropped, to provide a means for raising the revolving arms vertically, so as to hold them out of operation in moving to and from the fields and the turning around at the ends of the rows, and so as to enable the arms to be thrown out of gear for setting the parts in a line, and to place the trip-blocks upon the braces which connect the arms.

Figure 1:
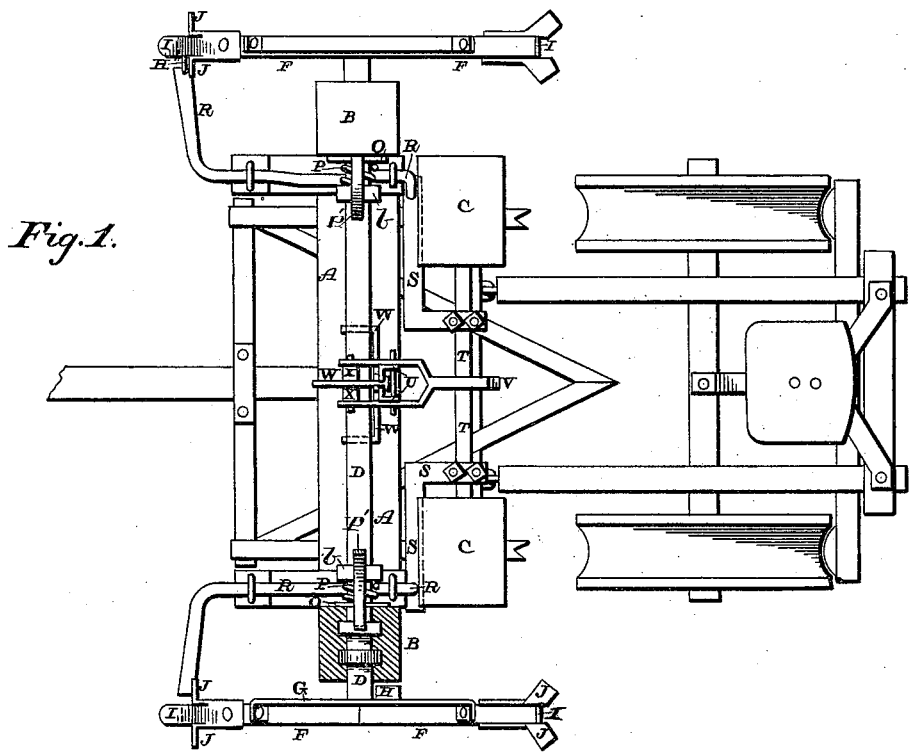
Figure 2:
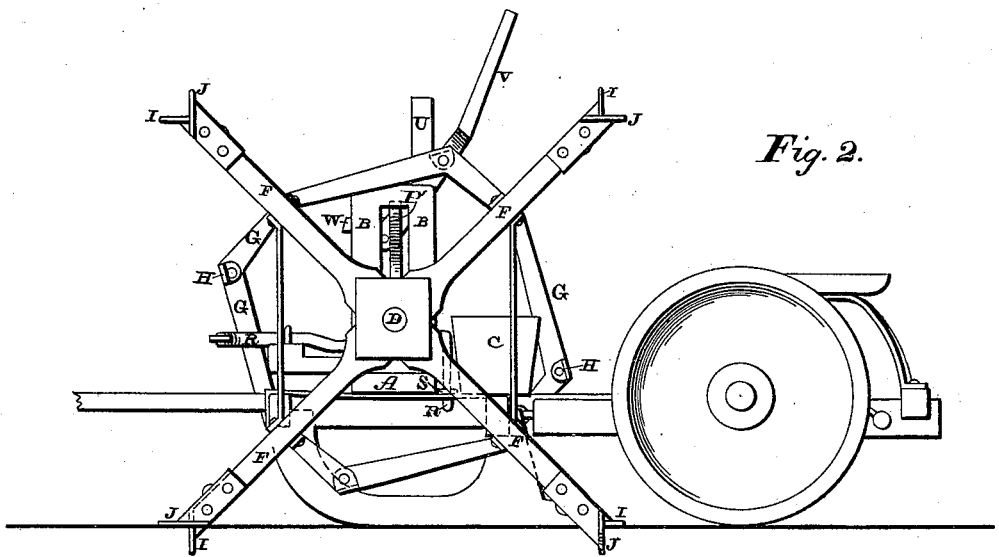
Figure 3:
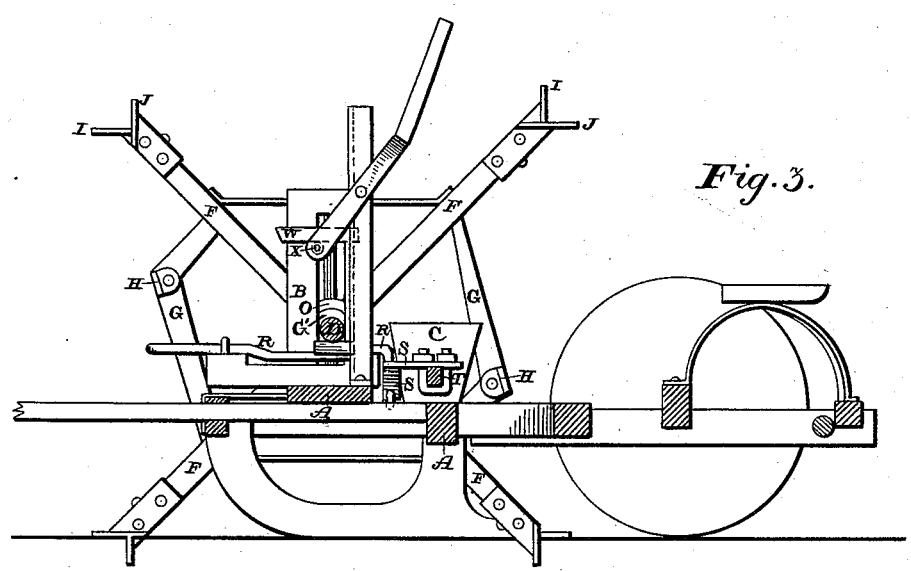
Figure 4:
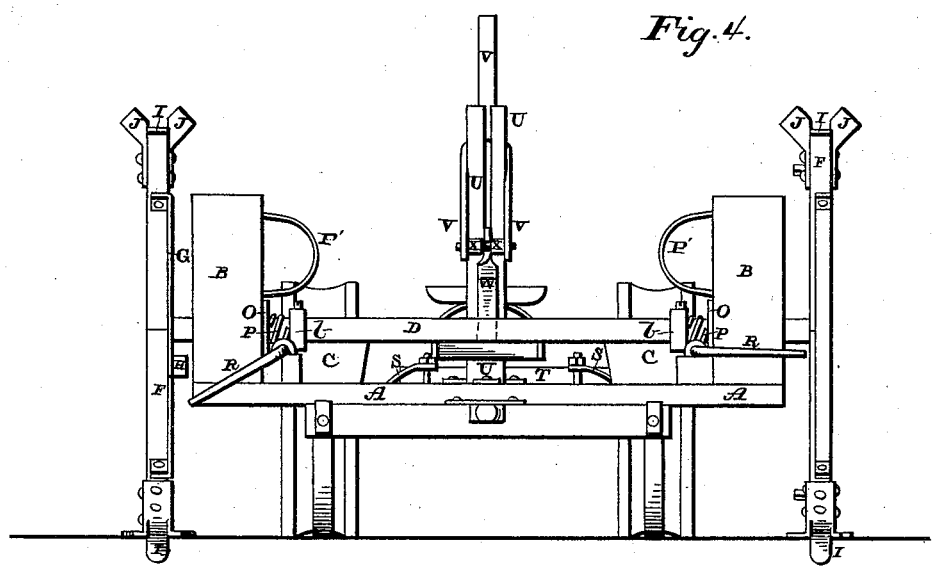

Figure 1 is a plan view of a machine which embodies my invention. Fig. 2 is a side elevation of the same. Fig. 3 is a vertical section of the machine, taken to one side of the elevating-lever. Fig. 4 is a front view.

A represents the frame-work, upon which the two vertically-slotted guides B and the seed-boxes C are placed. The shaft D extends across the top of the frame through the two vertical guides B, and has the arms F secured to opposite ends in the usual manner. These arms are arranged in relation to each other, as shown, and are connected by the braces G, which consist of flat metallic plates, and to which the trip-blocks H are secured.

These blocks, if desired, may be made adjustable, so that they can be set up or down upon the braces G to bring the corn that is dropped in line with the marks. The blocks are placed upon the braces, so that as they are carried around they trip the levers, so that the corn when dropped will be just opposite the marks.

Secured to each end of each of the arms F are the two side plates J and a central plate I, of any desired length and width, and which may be cast in a single piece. The central plate I is applied to the rear side of the outer end of the arm, which is beveled away, and the outer end of the plate is bent upon the same angle that the end of the arm is cut away, and the outer end of the plate I projects a suitable distance beyond the end of the arm, and the plates J are secured to the sides of the outer ends of the arms, and their ends are then turned so as to extend at an angle to the plate I. As each arm approaches the earth, these plates I J engage therewith, leaving a mark upon the surface of the ground just opposite the point at which the corn is dropped. The outer end of the plate I catches in the earth and makes a suitable hole or opening, while the ends of the plate J simply press down upon the ground, so as to leave marks which cannot be misunderstood and which are not easily obliterated.

Placed inside of the guides B are the vertically-moving boxes and rollers G, which freely rise and fall inside of the guides, so as to accommodate the arms to the inequalities of the ground.

In order to compel the boxes to quickly return to position and prevent their sticking, springs P are used. These springs are preferably bent, as shown, and have their ends turned at right angles, so that one will catch in the under side of the top of the guide while the other will catch in the top of the box. Applied to the outer side of the vertical guides B are the washers O, and bearing against the outer side of the washers are the springs P, which have their tension regulated by the adjustable collars *b* upon the shaft. These springs serve to prevent the shaft from having an endwise movement. The springs and washers allow one end of the shaft to rise faster than the other when uneven ground is encountered.

Pivoted upon each end of the frame inside of the vertical guides B are the partially-rotating shafts R, which have their front ends turned horizontally outward toward the revolving arms, and which ends are alternately struck by the trip-blocks as the arms are caused to revolve. The rear ends of these shafts R are bent downward and passed through the connecting-plates S, which are secured at their rear ends to the seed-slides T. As the shafts R are alternately struck and caused to partially revolve, the seed-slide is caused to reciprocate in the usual manner.

In order to hold the arms in a raised position, and thus prevent them from being operated as the machine is moved to and from the field, and to enable the arms to be raised when the machine is being turned around at the ends of the rows, and thus enable the arms to be adjusted so as to drop the corn correctly, there is secured to the central portion of the frame a perforated standard U, which is provided with a slot through its front side, and upon which standard is pivoted the vertically-adjustable lever V. Loosely catching over the front end of this lever is the elevating-rod W, which may either be of the shape here shown or any other that may be preferred, and which catches under the central portion of the shaft, so that when the rear end of the lever is depressed the operating-shaft is raised and held in an elevated position so that the arms are brought into operation. The front pronged ends of the operating-lever are connected by a cross-piece X, which catches under the outwardly-turned end of the elevating-rod, which is notched so as to form a catch, and thus automatically hold the shaft in a raised position without any further care on the part of the operator than to simply depress the rear end of the elevator.

Having thus described my invention, I claim—

1. The combination of the frame, the revolving shaft mounted thereon, the slotted standard, the operating-lever having its pronged ends connected, and the elevating-rods provided with an outwardly-turned and notched upper end for catching over the lever and having its lower ends to catch under the shaft, substantially as described.

2. The combination, with the revolving arms, of the shoes composed of plates I, having their ends inclined at a suitable angle, and the plates J, applied to the sides of the ends of the arms and having their ends turned outward, substantially as set forth.

3. The combination of the braces, the trip-block secured thereto, the partially-rotating shafts R, having their front ends turned outwardly toward the arms, the connecting rods or plates connected to the rear ends of the shafts, and the seed-slide, substantially as specified.

In testimony whereof I affix my signature in presence of two witnesses.

REASON L. WOODLING.

Witnesses:
  L. G. PATTERSON,
  BOSTON S. CONSTANT.